United States Patent
Asada (10) Patent No.: US 7,377,698 B2
(45) Date of Patent: May 27, 2008

(54) OPTICAL CONNECTOR

(75) Inventor: Kazuhiro Asada, Nagoya (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 552 days.

(21) Appl. No.: 09/899,919

(22) Filed: Jul. 9, 2001

(65) Prior Publication Data

US 2003/0007743 A1 Jan. 9, 2003

(51) Int. Cl.
*G02B 6/38* (2006.01)

(52) U.S. Cl. .......................... 385/62; 385/60

(58) Field of Classification Search ............ 385/62, 385/60, 56, 70, 75, 78, 81, 86, 87, 139, 136, 385/137

See application file for complete search history.

(56) References Cited

U.S. PATENT DOCUMENTS

| | | |
|---|---|---|
| 5,134,678 A | 7/1992 | Essert |
| 5,418,874 A | 5/1995 | Carlisle et al. |
| 5,452,386 A * | 9/1995 | van Woesik ............ 438/34 |
| 5,553,181 A | 9/1996 | van Woesik |
| 6,081,642 A | 6/2000 | Asada |
| 6,174,091 B1 * | 1/2001 | Herrmann .............. 347/176 |
| 6,401,585 B1 * | 6/2002 | Morgan ................. 385/60 |

FOREIGN PATENT DOCUMENTS

| | | |
|---|---|---|
| EP | 0 177 937 A2 | 4/1986 |
| EP | 0 770 891 A2 | 5/1997 |
| EP | 0 869 378 A1 | 10/1998 |
| JP | A-58-174916 | 10/1983 |
| JP | U-61-2606 | 1/1986 |
| JP | U-61-176511 | 11/1986 |
| JP | A-62-159108 | 7/1987 |
| JP | A 10-232329 | 9/1998 |
| JP | A 11-6939 | 1/1999 |
| JP | A 11-084163 | 3/1999 |
| JP | A 11-084175 | 3/1999 |

* cited by examiner

Primary Examiner—Toan Ton
Assistant Examiner—Richard H Kim
(74) Attorney, Agent, or Firm—Oliff & Berridge, PLC (57) ABSTRACT

In an optical connector 1, a cord receiving hole portion 11c, where an optical fiber cord 90 can be inserted and received axially of the optical fiber cord, is formed in a housing 10. A mounting hole 13, through which a stopper 40 can be inserted into the portion 11c perpendicularly to an insertion direction of the cord 90, is formed in the housing. A positioning slit 42, having a width slightly smaller than the diameter of the cord 90, is formed in each plate-like portion 41. A blade portion 43 with an angle 90° is formed at each open end of the slit 42. When the stopper 40 is inserted into the portion 11c through the hole 13, each portion 43 abuts against a covering portion 92, and penetrates into the portion 92 while forcing a cut portion of this portion 92 away in the stopper insertion direction.

4 Claims, 6 Drawing Sheets

OPTICAL CONNECTOR

BACKGROUND OF THE INVENTION

1. Field of the Invention

This invention relates to an optical connector for connecting an optical fiber cord to a photoelectric device or for connecting optical fiber cords together.

2. Description of the Related Art

One conventional structure, by which an optical connector holds an optical fiber cord, is disclosed in JP-A-58-185810U.

In this optical connector, a U-shaped groove is formed in a clamp formed by a thin metal sheet, and this U-shaped groove portion is press-fitted on a sheath (covering) of an optical fiber cord in biting relation thereto, thereby holding the optical fiber cord. Here, a width of the U-shaped groove is slightly smaller than the diameter of the cord, and an open end of this U-shaped groove expands gradually toward the open side thereof. When inserting the optical fiber cord into the U-shaped groove, the optical fiber cord is introduced into the U-shaped groove through the expanding open end thereof, and side edge portions of this U-shaped groove bite into the sheath of the cord.

However, in the connector disclosed in JP-A-58-185810U, when the optical fiber cord is introduced into the U-shaped groove through the expanding open end thereof, a large force, compressing the optical fiber cord radially inwardly, acts on this optical fiber cord, so that a strain due to this compression develops in the optical fiber itself, which invites a problem that a light loss increases.

SUMMARY OF THE INVENTION

Therefore, this invention has been made in order to solve the above problems, and an object of the invention is to provide an optical connector capable of keeping a loss of an optical fiber to a low level.

According to the present invention, there is provided an optical connector comprising:

a housing having a cord receiving hole portion in which an optical fiber cord can be inserted and received along an axis of the optical fiber cord; and a stopper including a plate-like portion having a positioning slit having a width slightly smaller than a diameter of the optical fiber cord;

wherein a mounting hole, through which the plate-like portion of the stopper can be inserted into the cord receiving hole portion in a direction perpendicular to a direction of insertion of the optical fiber cord, is formed in the housing, and the housing has stopper retaining portions for holding the plate-like portion of the stopper in a posture perpendicular to the direction of insertion of the optical fiber cord; and wherein when the stopper is inserted into the cord receiving hole portion, each of blade portions, formed by a side edge of the positioning slit and a distal end edge of the plate-like portion disposed perpendicular to the side edge, penetrates into a covering portion of the optical fiber in a direction different from a direction toward an axis of the optical fiber cord, while forcing a portion of the covering portion away, thereby positioning the optical fiber cord in a fixed manner in the direction of the axis of the optical fiber cord.

The stopper may include a pair of the plate-like portions interconnected by an interconnecting piece portion in parallel relation to each other, so that the stopper has a generally U-shape when viewed from the side thereof, and when the stopper is inserted into the cord receiving hole portion, the pair of plate-like portions position the optical fiber cord in a fixed manner in the direction of the axis of the optical fiber cord.

Each of the opposed side edges of the positioning slit may be tapering toward the inside of the positioning slit.

The distal end edge of the plate-like portion may be tapering in a direction of insertion of the plate-like portion.

Reverse blades may be formed on and project from each of the opposed side edges of the positioning slit toward the inside of the positioning slit, the reverse blades being directed in a direction generally opposite to the direction of insertion of the plate-like portion.

DETAILED DESCRIPTION OF THE PREFERRED EMBODIMENTS

Now, a description will be given in more detail of preferred embodiments of the invention with reference to the accompanying drawings.

A preferred embodiment of an optical connector of the present invention will now be described.

Figure 1:
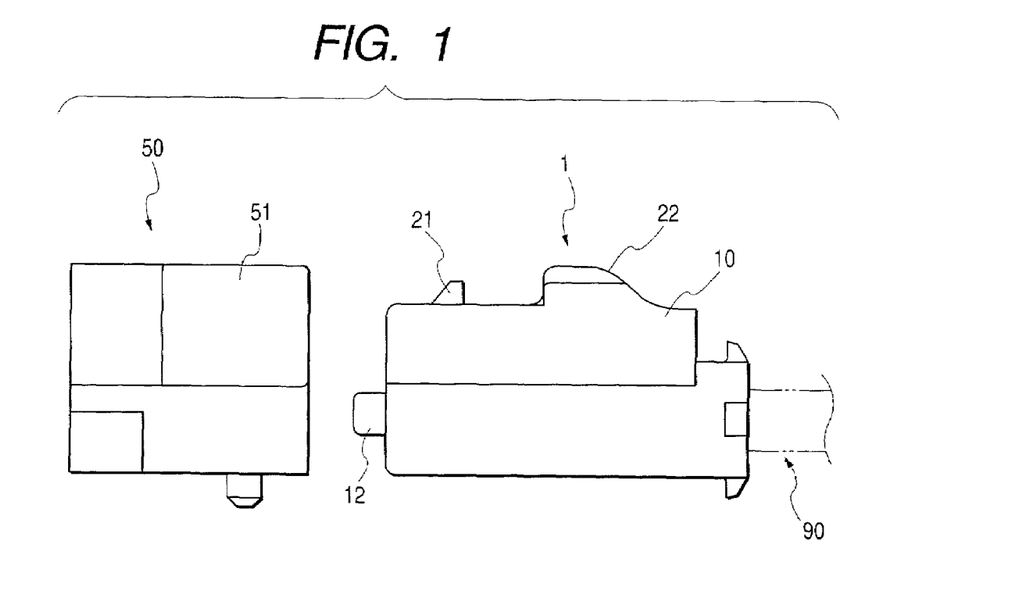
FIG. 1 is a side-elevational view showing a preferred embodiment of an optical connector of the present invention and a module-side optical connector.
Figure 2:
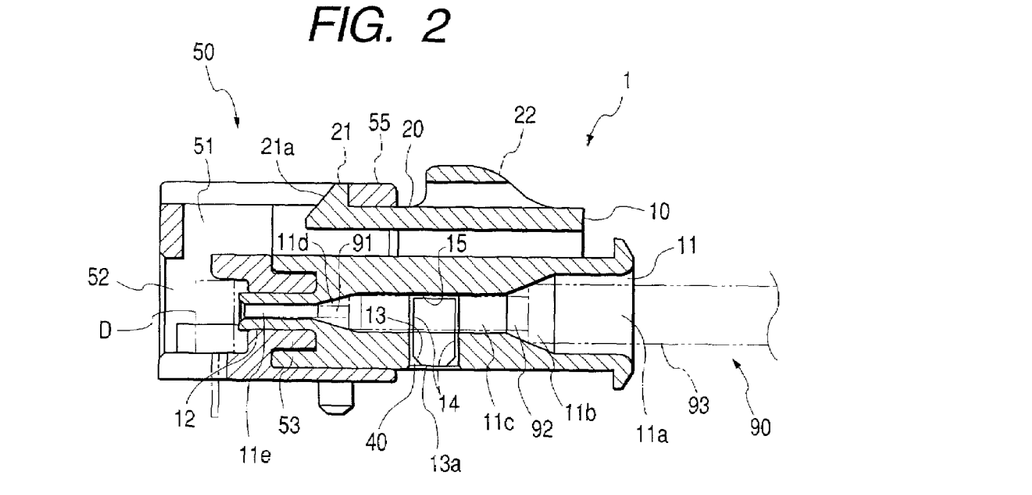
FIG. 2 is a cross-sectional view showing the optical connector and the module-side optical connector in a mutually-connected condition.
Figure 3:
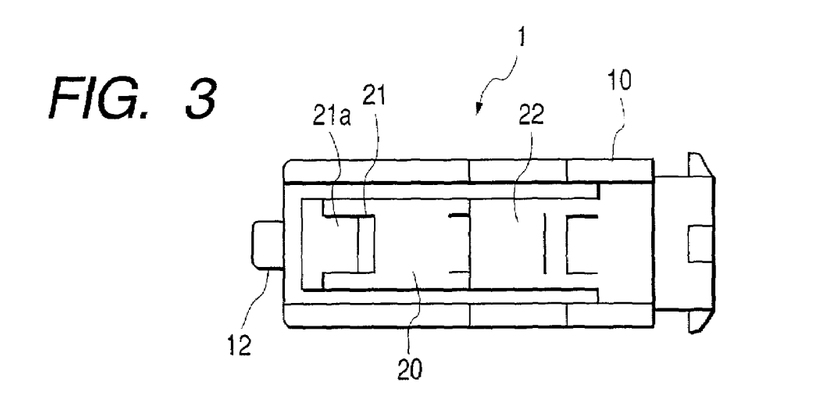
FIG. 3 is a plan view of the optical connector.

As shown in FIGS. 1 and 2, the optical connector 1 holds an optical fiber cord 90 in a positioned condition, and in this condition this optical connector 1 can be connected to a module-side optical connector 50. When this optical connector 1 is thus connected to the module-side optical connector 50, the optical fiber cord 90 is optically coupled to a photoelectric device D received within the module-side optical connector 50.

Here, the module-side optical connector 50 will be described. As shown in FIGS. 1 and 2, the module-side optical connector 50 includes a housing 51 made of a resin, and a device receiving portion 52 for receiving the photoelectric device D, such as a light-emitting element and a light-receiving element, is formed within the housing 51, and the photoelectric device D is adapted to be received and held in a predetermined posture in this device receiving portion 52.

A tubular ferrule-introducing portion 53 for receiving a ferrule 12 of the optical connector 1 (described later) is formed at a front end portion of the housing 51, and is disposed forwardly of a light-emitting surface or a light-receiving surface of the photoelectric device D received in the device receiving portion 52. When the ferrule 12 of the optical connector 1 is inserted into the ferrule-introducing portion 53, an end surface of an optical fiber 91, received in the ferrule-introducing portion 53, is disposed in opposed relation to the light-emitting surface or the light-receiving surface of the photoelectric device D, and in this manner the optical fiber 91 is optically coupled to the photoelectric device D.

An engagement portion 55, with which an engagement projection 21 of the optical connector 1 (described later) is engageable, is formed at an upper portion of the front end of the housing 51. When the engagement projection 21 of the optical connector 1 is engaged with the engagement portion 55, the optical connector 1 is kept connected to the module-side optical connector 50 against withdrawal.

Referring back to the constituent elements of the optical connector 1, this optical connector 1 comprises a housing 10, and a stopper 40 mounted on this housing 10, as shown in FIG. 2.

As shown in FIGS. 1 to 7, the housing 10 is made of a resin or the like, and is formed into a generally square tubular shape, and a receiving hole 11 is formed in the housing 10, and extends along the axis thereof.

The optical fiber cord 90, which is to be inserted into the receiving hole 11, and is to be positioned in a fixed manner, includes a first covering portion 92, formed or coated on an outer periphery of the optical fiber 91 (which comprises a core and a clad), and a second covering portion 93 formed or coated on an outer periphery of the first covering portion 92. The second covering portion 93 is removed over a predetermined length from the end portion of the optical fiber cord 90 to expose the first covering portion 92, and further the first covering portion 92 is removed over a predetermined length from a distal end portion of the second covering portion-removed portion of the optical fiber cord 90 to expose the optical fiber 91 (see FIG. 2).

The receiving hole 11 includes an introducing portion 11a, a cord receiving hole portion 11c and a ferrule receiving hole portion 11e which are arranged serially on a straight line in this order from a rear end of the housing 10 toward a front end thereof, and the portion 11a is larger in inner diameter than the portion 11c, and the portion 11c is larger in inner diameter than the portion 11e. The inner diameter of the introducing portion 11a is slightly larger than the outer diameter of the second covering portion 93 of the optical fiber cord 90, and the inner diameter of the cord receiving hole portion 11c is slightly larger than the outer diameter of the first covering portion 92 of the optical fiber cord 90, and the inner diameter of the ferrule receiving hole portion 11e is substantially equal to the outer diameter of the optical fiber 91 (see FIGS. 2 and 7). The ferrule receiving hole portion 11e extends through the ferrule 12 projecting from the front end of the housing 10.

When the end portion of the optical fiber cord 90 is inserted into the receiving hole 11 from the rear side thereof, the second covering portion 93 of the optical fiber cord 90 is received in the introducing portion 11a, and the first covering portion 92 of the optical fiber cord 90 is received in the cord receiving hole portion 11c, and the optical fiber 91 is received in the ferrule receiving hole portion 11e. At this time, the optical fiber 91 is received and held in a radially-positioned condition since the inner diameter of the ferrule receiving hole portion 11e is substantially equal to the outer diameter of the optical fiber 91. Then, the end surface of the optical fiber 91 is processed into a specular surface at the distal end of the ferrule 12, and the ferrule 12 is inserted into the ferrule-introducing portion 53 of the module-side optical connector 50 in such a manner that the distal end of the ferrule 12 is first introduced into this ferrule-introducing portion 53, and as a result the end surface of the optical fiber 91 is disposed in opposed relation to the light-emitting surface or the light-receiving surface of the photoelectric device D.

A tapering portion 11b is formed between the introducing portion 11a and the cord receiving hole portion 11c, and also a tapering portion 11d is formed between the cord receiving hole portion 11c and the ferrule receiving hole portion 11e, and each of these tapering portions 11b and 11d is decreasing in diameter gradually toward the front end of the receiving hole 11. A corner portion between the tapering portion 11b and the introducing portion 11a, a corner portion between the tapering portion 11b and the cord receiving hole portion 11c, a corner portion between the tapering portion 11d and the cord receiving hole portion 11c, and a corner portion between the tapering portion 11d and the ferrule receiving hole portion 11e are chamfered into a generally-rounded shape so that when the end portion of the optical fiber cord 90 is inserted into the receiving hole 11, this optical fiber cord 90 can be smoothly inserted thereinto without being caught by the inner peripheral surface of the receiving hole 11.

Figure 4:
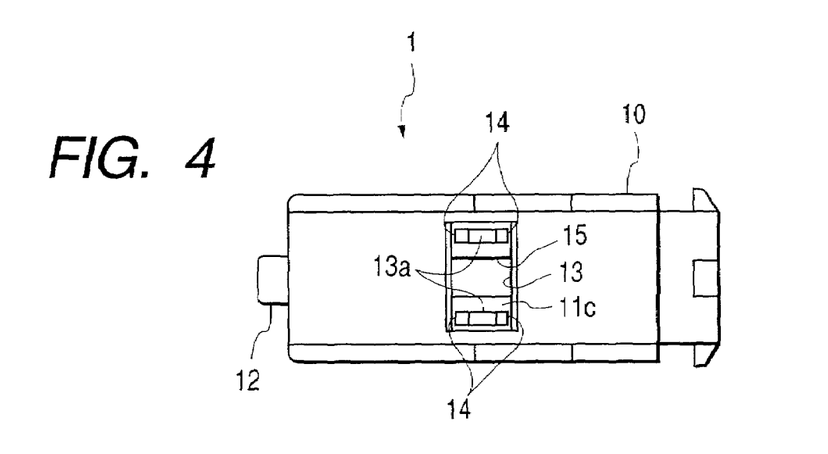
FIG. 4 is a bottom view of the optical connector.
Figure 5:
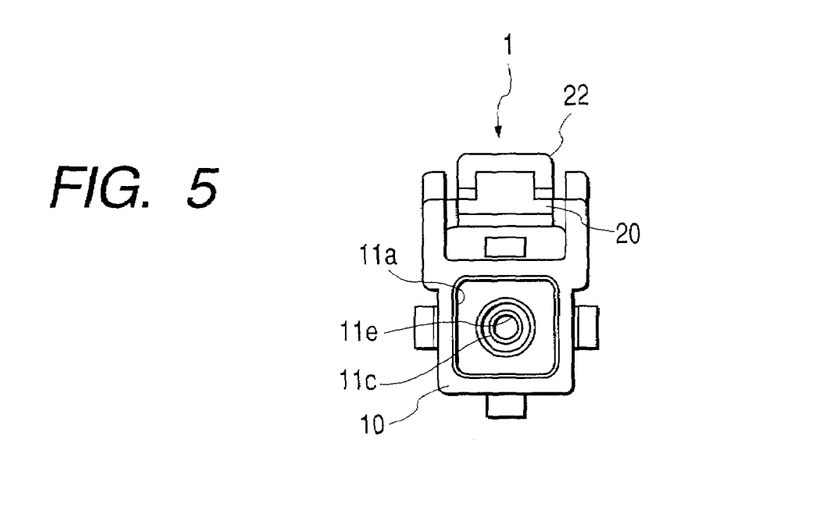
FIG. 5 is a rear view of the optical connector.
Figure 6:
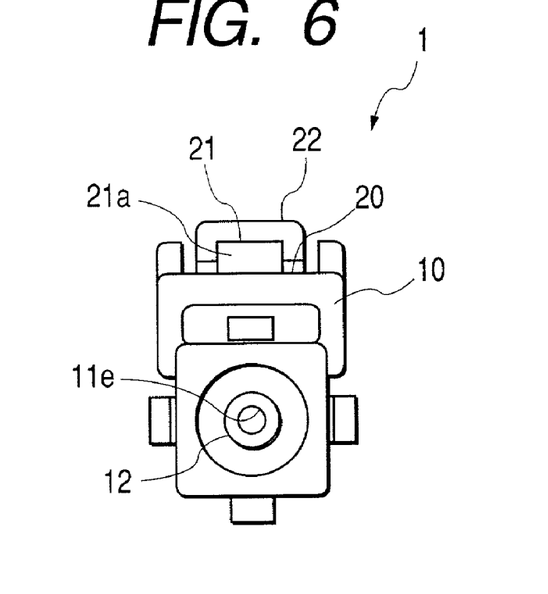
FIG. 6 is a front-elevational view of the optical connector.
Figure 7:
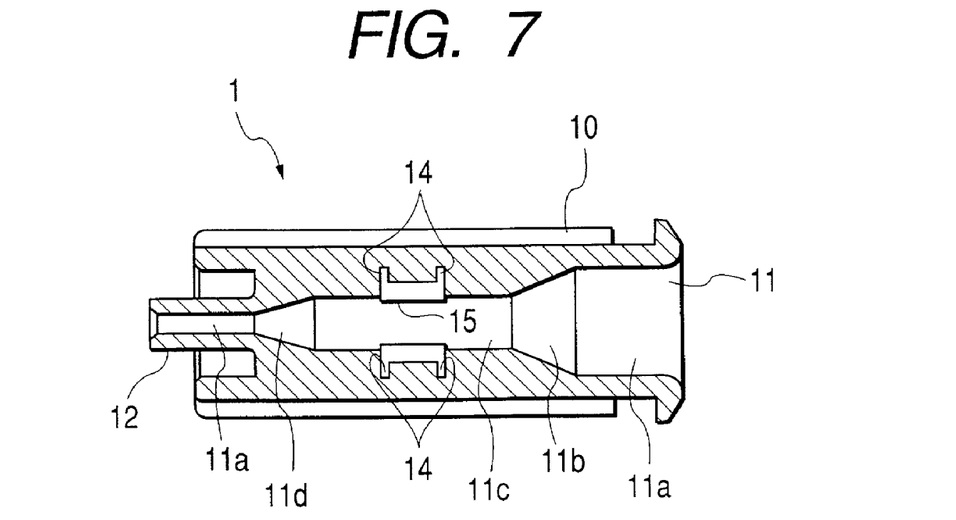
FIG. 7 is cross-sectional view of the optical connector.
Figure 8A:
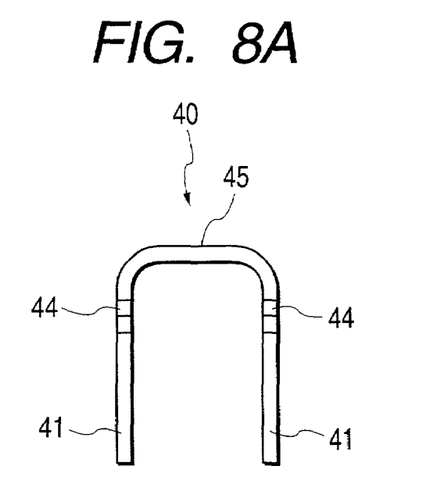
FIGS. 8A is a side-elevational view of a stopper.
Figure 8B:
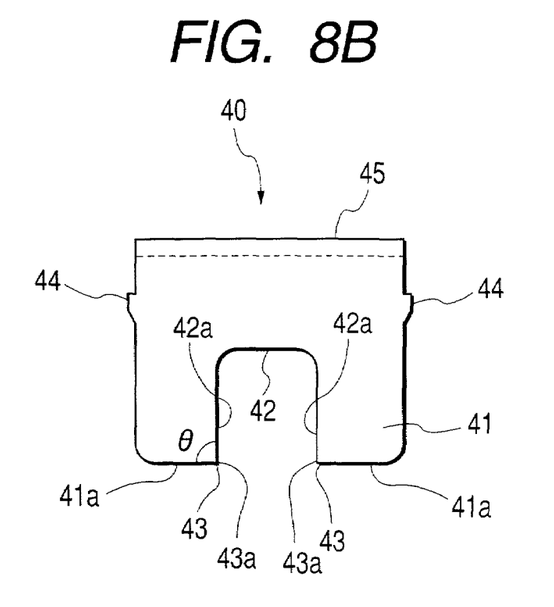
FIG. 8B is a front-elevational view of the stopper.
Figure 8C:
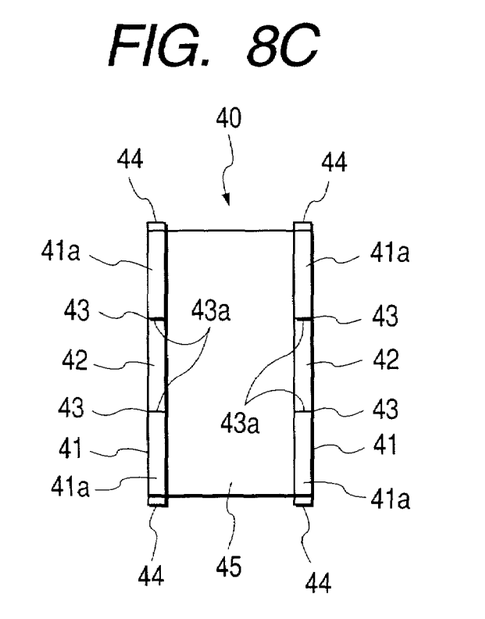
FIG. 8C is a bottom view of the stopper.

A mounting hole 13 of a generally square shape is formed in a bottom portion of the housing 10, and plate-like portions 41 (described later) of the stopper 40 can be inserted into the cord receiving hole portion 11c through this mounting hole 13 in a direction perpendicular to the direction of insertion of the optical fiber cord 90 (see FIGS. 2 and 4).

That portion of the cord receiving hole portion 11c, corresponding to the mounting hole 13, has a generally box-shaped space (see its cross-sectional shape in FIGS. 9 and 10), and a pair of right and left retaining grooves 14 are formed respectively in front portions of opposed inner side surfaces of this box-shaped space, and another pair of right and left retaining grooves 14 are formed respectively in rear portions of these opposed inner side surfaces. Opposite side edges of one of the pair of plate-like portions 41 of the stopper 40 can be slidingly fitted in the pair of front retaining grooves 14, respectively, whereas opposite side edges of the other plate-like portion 41 can be slidingly fitted in the pair of rear retaining grooves 14, respectively, so that each plate-like portion 41 can be held in a posture perpendicular to the direction of insertion of the optical fiber cord 90.

The inner surface of the cord receiving hole portion 11c, disposed in opposed relation to the mounting hole 13, is formed into a groove 15 which extends in the direction of insertion of the optical fiber cord 90, and has an arcuate shape corresponding in curvature to the first covering portion 92 of the optical fiber cord 90. When the first covering portion 92 of the optical fiber cord 90 is received in the cord receiving hole portion 11c, this first covering portion 92 is fitted in the groove 15, so that the optical fiber cord 90 is supported along the axis of the cord receiving hole portion 11c.

An engagement extension piece portion 20 is formed on the upper surface of the housing 10 in a cantilever manner, and extends from the rear end portion of this housing toward the front end thereof. The engagement projection 21 for engagement with the engagement portion 55 of the module-side optical connector 50 is formed at a distal end of the engagement extension piece portion 20. For connecting the optical fiber-side optical connector 1 and the module-side optical connector 50 together, a slanting surface 21a of the engagement projection 21 is pressed against the engagement portion 55, and therefore the engagement extension piece portion 20 is elastically deformed downwardly, thus moving the engagement projection 21 downward, and the engagement projection 21 is slid past the engagement portion 55, and is engaged therewith, thereby holding the two connectors 1 and 50 in a connected condition. An operating portion 22 is formed on an upper surface of the engagement extension piece portion 20, and when canceling the connected condition of the two connectors 1 and 50, the operating portion 22 is pressed down to cancel the engagement of the engagement projection 21 of the optical fiber-side optical connector 1 with the engagement portion 55 of the module-side optical connector 50.

As shown in FIGS. 2, 8A to 8C and 9, the stopper 40 is formed, for example, by pressing a thin sheet member of metal or other material into a predetermined shape, and this stopper includes the pair of generally-square plate-like portions 41 of a predetermined thickness interconnected by an interconnecting piece portion 45 in parallel relation to each other, so that this stopper has a generally U-shape when viewed from the side thereof.

Each of the plate-like portions 41 is in the form of a generally square plate having a uniform thickness over an entire area thereof, and a positioning slit 42 of a U-shaped contour is formed in a widthwise-central portion of the plate-like portion 41, and is open to a distal end of the plate-like portion 41.

Each of the plate-like portions 41 is inserted into the cord receiving hole portion 11c through the mounting hole 13, with the opposite side edges thereof slidingly fitted respectively in the associated retaining grooves 14 formed respectively in the inner side surfaces of the cord receiving hole portion 11c. By doing so, each plate-like portion 41 is held in the cord receiving hole portion 11c in a posture perpendicular to the direction of insertion of the optical fiber cord 90.

When the plate-like portions 41 are thus inserted in the cord receiving hole portion 11c, the interconnecting piece portion 45 is abutted against lower surfaces 13a of the side walls, each formed between the front and rear retaining grooves 14 in the mounting hole 13, thereby limiting the movement of the stopper 40 in the inserting direction, and besides retaining engagement piece portions 44, formed respectively on the opposite side edges of each plate-like portion 41, are engaged respectively in engagement recesses 14a, formed respectively at lower ends of the corresponding retaining grooves 14, thereby preventing the plate-like portion from moving in a withdrawing direction. At this time, the interconnecting piece portion 45 is disposed in a position where it closes the mounting hole 13.

Each of the positioning slits 42 has a width slightly smaller than the diameter of the optical fiber cord 90 which is to be positioned by these positioning slits. In this embodiment, that portion of the optical fiber cord 90, at which the first covering portion 92 is exposed by removing the second covering portion 93, is to be held in a positioned condition by the stopper 40. Therefore, the width of each positioning slit 42 is slightly smaller than the diameter of the exposed first covering portion 92.

Blade portions 43 are formed respectively at open (distal) ends of opposed side edges 42a of the positioning slit 42, and each blade portion 43 is formed by the side edge 42a of the positioning slit 42 and a distal end edge 41a of the plate-like portion 41. Each blade portion 43 is defined by the surface of the side edge 42a of the positioning slit 42 (which is parallel to the direction of insertion of the plate-like portion 41) and the surface of the distal end edge 41a of the plate-like portion 41 which perpendicularly intersect each other. Each blade portion 43 has an edge portion 43a extending in a direction parallel to the axis of the optical fiber cord 90. When each edge portion 43a is brought into abutting engagement with the first covering portion 92 of the optical fiber cord 90, this edge portion 43a cuts this first covering portion 92 as in a planer, and penetrates into this cut portion of the first covering portion 92.

Figure 10:
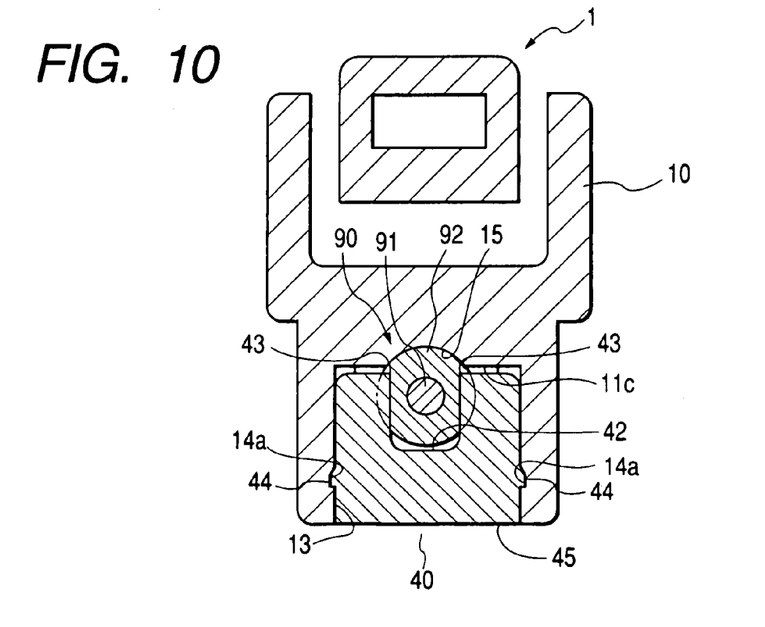
FIG. 10 is a cross-sectional view showing the process of holding the optical fiber cord in the optical connector.

When the plate-like portions 41 are inserted and received in the cord receiving hole portion 11c, each blade portion 43 is disposed adjacent to the inner portion of the inner peripheral surface of the cord receiving hole portion 11c facing away from the mounting hole 13, and is disposed slightly short of that portion of the peripheral surface of the first covering portion 92 facing away from that portion of this peripheral surface with which the blade portion 43 has been brought into cutting engagement (see FIG. 10). Thus, with this very compact construction, the optical fiber cord 90 can be positioned in a fixed manner.

The optical connector of this embodiment has the above construction, and next the procedure of holding the optical fiber cord 90 by this optical connector 1 will be described.

Figure 9:
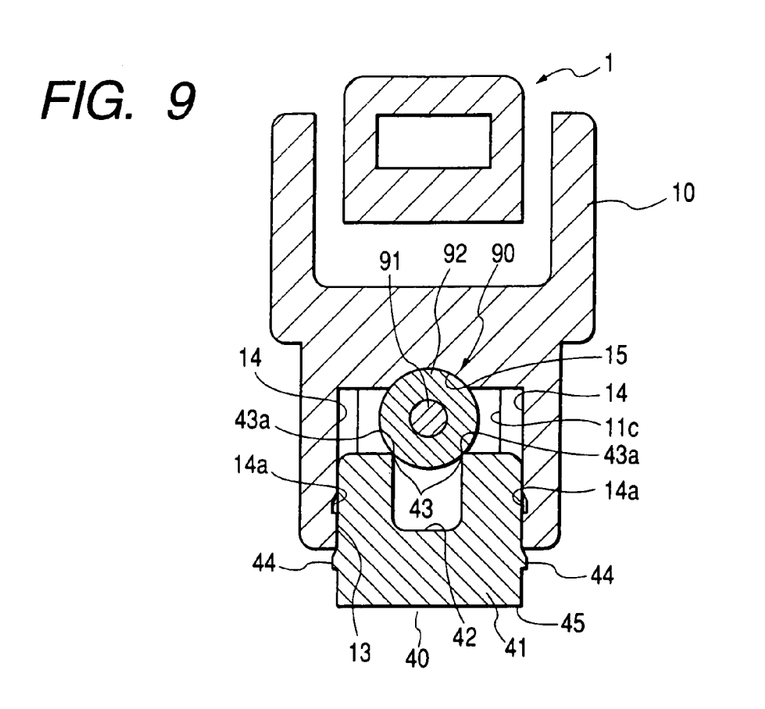
FIG. 9 is a cross-sectional view showing a process of holding an optical fiber cord in the optical connector.

First, the end portion of the optical fiber cord 90, from which the first covering portion 92 and the second covering portion 93 have been removed, is inserted into the receiving hole 11 in the housing 10 from the rear side thereof, and the exposed optical fiber 91, the exposed first covering portion 92, and the end portion of the second covering portion 93 are received respectively in the ferrule receiving hole portion 11e, the cord receiving hole portion 11c and the introducing portion 11a, respectively (see FIG. 2). Then, in this condition, the stopper 40 is pushed into the cord receiving hole portion 11c through the mounting hole 13. As a result, the edge portion 43a of each blade portion 43 abuts against a lower portion of the outer peripheral surface of the first covering portion 92 of the optical fiber cord 90 disposed in offset relation to a vertical plane in which the axis of the optical fiber cord 90 lies, as shown in FIG. 9. When the stopper 40 is further pushed, each blade portion 43 cuts the first covering portion 92 of the optical fiber cord 90 as in a planer, and penetrates into the first covering portion 92 while pushing the cut portion in its inserting direction, and moves upward. Then, when the stopper 40 is fully pushed into its innermost position (where the interconnecting piece portion 45 is abutted against the lower surfaces 13a of the side walls each formed between the front and rear retaining grooves 14) as shown in FIG. 10, the opposed side edges 42a of each positioning slit 42 are engaged respectively in those portions of the first covering portion 92, forced away respectively by the blade portions 43, and hold the first covering portion 92 of the optical fiber cord 90 therebetween, so that the optical fiber cord 90 is held in a positioned condition in its axial direction.

In the optical connector of the above construction, the blade portions 43 are formed respectively at the open (distal) ends of the opposed side edges 42a of the positioning slit 42, and each blade portion 43 is formed by the side edge 42a of the positioning slit 42 and the distal end edge 41a of the plate-like portion 41. Therefore, when each blade portion 43 is pressed against the first covering portion 92 of the optical fiber cord 90, the blade portion 43 cuts the first covering portion 92 of the optical fiber cord 90 as in a planer, and penetrates into the first covering portion 92 while forcing the cut portion away in its inserting direction, and the opposed side edges 42a of each positioning slit 42 are engaged respectively in those portions of the first covering portion 92 forced away respectively by the blade portions 43. Therefore, not only when the stopper 40 is pushed to be inserted, but also when the optical fiber cord 90 is retained after the mounting of the stopper 40, the stopper 40 is less liable to impart to the optical fiber 91 an excessive pressing force tending to compress this optical fiber 91 in its radial direction, and a strain, developing in the optical fiber 91 is small, so that a light loss can be kept to a low level.

In the embodiment of the present invention, the first covering portion 92 of the optical fiber cord 90 is made, for example, of a relatively rigid resin such as polypropylene (pp), and this is effective particularly in the case where a force, applied to the outer periphery of the first covering portion 92, acts directly on the optical fiber 91 within this first covering portion. When a relatively rigid resin, such as polypropylene, is used to form the first covering portion 92 of the optical fiber cord 90, the first covering portion 92, in which the opposed side edges 42*a* of each positioning slit 42 are engaged, is less liable to be deformed, and therefore there is achieved an advantage that the optical fiber cord can be fixed positively and firmly.

The stopper 40 includes the pair of plate-like portions 41 interconnected by the interconnecting piece portion 45 such that this stopper has a generally U-shape when viewed from the side thereof, and each of the plate-like portions 41 positions and fixes the optical fiber cord 90 in the axial direction, and therefore this stopper provides the excellent positioning/retaining force.

Figure 11:
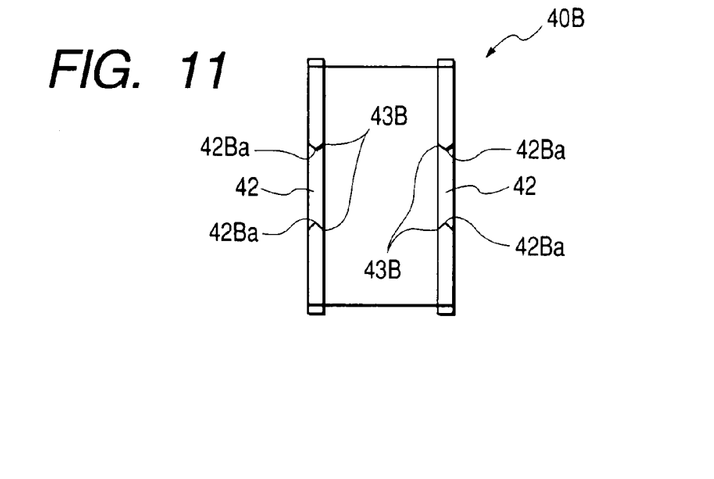
FIG. 11 is a bottom view showing a first modified stopper.

FIG. 11 shows a stopper 40B (first modification). Each of opposed side edges 42Ba of a positioning slit 42 has a triangular cross-section, and is tapering toward the inside of the positioning slit 42. In this case, those portions of the stopper, which penetrate into the first covering portion 92, are thinner, and therefore each blade portion 43B can be caused to penetrate into the first covering portion 92 with a smaller force.

Figure 12:
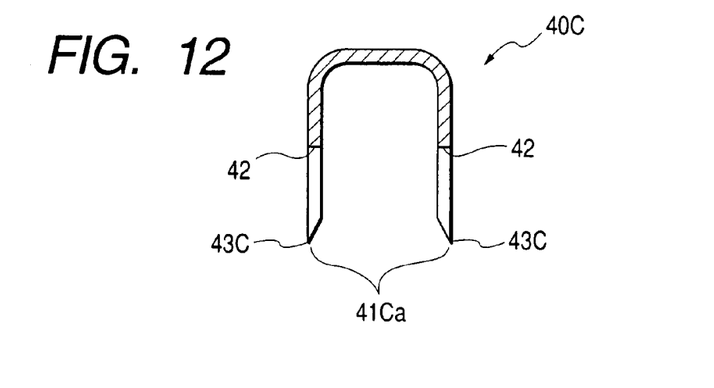
FIG. 12 is a cross-sectional view showing a second modified stopper.

FIG. 12 shows a stopper 40C (second modification). A distal end edge portion 41Ca of each plate-like portion 41, with which opposed side edges of a positioning slit 42 are continuous, is tapering toward its distal end.

In this case, when each blade portion 43C is brought into abutting engagement with the first covering portion 92, the blade portion 43C cuts into the first covering portion 92. At this time, the blade portion 43C penetrates into the first covering portion 92 of the optical fiber cord 90 while forcing the cut portion aside in opposite directions of the width of the blade portion 43C along the axis of the optical fiber cord 90, since the distal end edge portion 41Ca of each plate-like portion 41 is tapering toward its distal end. Therefore, as described above, the stopper 40C is less liable to impart to the optical fiber 91 an excessive pressing force tending to compress this optical fiber in its radial direction, so that a light loss can be kept to a low level, and besides this operation can be smoothly carried out with a smaller force.

The side edges 42Ba of the positioning slit of the first modification and the distal end edge 41Ca of the second modification may be formed into a single blade surface-type or a double blade surface-type.

Figure 13:
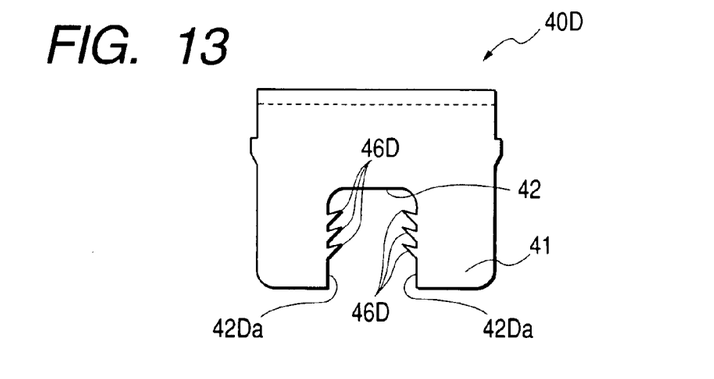
FIG. 13 is a front-elevational view of a third modified stopper.

FIG. 13 shows a stopper 40D (third modification). Reverse blades 46D are formed on and project from each of opposed side edges 42Da of a positioning slit 42 of each plate-like portion 41 of the stopper 40D toward the inside of the slit 42, the reverse blades 46D being directed in a direction generally opposite to the direction of insertion of the plate-like portion 41. Each of the reverse blades 46D is formed by a lower guide blade portion (generally facing the open side of the positioning slit 42), slanting toward the inside of the slit 42 in the direction opposite to the inserting direction, and an upper blade portion (generally facing the inner end of the positioning slit 42) slanting a little more gently in the same direction as that of the guide blade portion, and the guide blade portion and the upper blade portion intersect each other at an acute angle. When each blade portion 43 penetrates into the first covering portion 92 while cutting this first covering portion, each guide blade portion moves in sliding contact with the cut portion of the first covering portion 92, so that the opposed side edges 42Da of the positioning slit smoothly penetrate into the first covering portion 92. On the other hand, when a force acts on the plate-like portions 41 in a direction opposite to the above direction, the reverse blades 46D bite into the first covering portion 92, thereby preventing the withdrawal of the plate-like portions.

As described above, the optical connector of the present invention comprises the housing having the cord receiving hole portion in which the optical fiber cord can be inserted and received along the axis of the optical fiber cord, and the stopper including the plate-like portion having the positioning slit having the width slightly smaller than the diameter of the optical fiber cord, and the mounting hole, through which the plate-like portion of the stopper can be inserted into the cord receiving hole portion in the direction perpendicular to the direction of insertion of the optical fiber cord, is formed in the housing, and the housing has the stopper retaining portions for holding the plate-like portion of the stopper in a posture perpendicular to the direction of insertion of the optical fiber cord, and when the stopper is inserted into the cord receiving hole portion, each of blade portions, formed by the side edge of the positioning slit and the distal end edge of the plate-like portion disposed perpendicular to the side edge, penetrates into the covering portion of the optical fiber in the direction different from the direction toward the axis of the optical fiber cord, while forcing a portion of the covering portion away, thereby positioning the optical fiber cord in a fixed manner in the direction of the axis of the optical fiber cord. Therefore, when positioning the optical fiber cord in a fixed manner and after this cord is positioned in a fixed manner, those portions of the covering portion, in which the blades portions have penetrated, are less liable to compress the optical fiber in its radial direction, and therefore a strain is less liable to develop in the optical fiber, so that a light loss of the optical fiber can be kept to a low level.

In the invention, the stopper include the pair of the plate-like portions interconnected by the interconnecting piece portion in parallel relation to each other, so that the stopper has a generally U-shape when viewed from the side thereof, and when the stopper is inserted into the cord receiving hole portion, the pair of plate-like portions position the optical fiber cord in a fixed manner in the direction of the axis of the optical fiber cord. With this construction, the optical fiber cord can be more positively positioned in a fixed manner In the invention, each of the opposed side edges of the positioning slit is tapering toward the inside of the positioning slit. With this construction, the opposed side edges of the positioning slit can penetrate into the covering portion of the optical fiber cord more easily.

In the invention, the distal end edge of the plate-like portion is tapering in the direction of insertion of the plate-like portion. With this construction, the blade portion can easily penetrate into the covering portion of the optical fiber cord while forcing the cut portion aside in opposite directions of the width of the blade portion along the axis of the optical fiber cord.

In the invention, the reverse blades are formed on and project from each of the opposed side edges of the positioning slit toward the inside of the positioning slit, the reverse blades being directed in a direction generally opposite to the direction of insertion of the plate-like portion. With this construction, when the blade portion penetrates into the covering portion, the reverse blades bite into the covering portion, and therefore the optical fiber cord is prevented from being withdrawn from the positioning slit in the stopper.

What is claimed is:

1. An optical connector comprising:
   a housing having a cord receiving hole portion and a mounting hole, the cord receiving hole portion receiving an optical fiber cord to be inserted along an axis of said optical fiber cord in a cord insertion direction, the mounting hole disposed along said cord receiving hole portion; and
   a stopper including a plate-like portion having a positioning slit between blade portions, the positioning slit having a width slightly smaller than a diameter of said optical fiber cord, each of the blade portions being formed by a side edge of said positioning slit joined at a right angle to a distal end edge of said plate-like portion; wherein
   said plate-like portion of said stopper can be inserted into said mounting hole along said cord receiving hole portion in a stopper insertion direction perpendicular to the cord insertion direction of said optical fiber cord;
   said housing has stopper retaining portions for holding said plate-like portion of said stopper, said stopper retaining portions engaging a retaining side of said plate-like portion and having a cross-section perpendicular to the cord insertion direction of said optical fiber cord;
   when said stopper is inserted into said mounting hole along said cord receiving hole portion, said each of said blade portions penetrates into a covering portion of said optical fiber cord, with the positioning slit being perpendicular to the axis of said optical fiber cord, while said each of the blade portions removes a portion of said covering portion, thereby fixing said optical fiber cord along the axis of said optical fiber cord; and
   reverse blades are formed on and project from each of the opposed side edges of said positioning slit toward the inside of said positioning slit, said reverse blades being directed in a direction generally opposite to the direction of insertion of said plate-like portion.

2. An optical connector according to claim 1, wherein said stopper includes a pair of said plate-like portions interconnected by an interconnecting piece portion in parallel relation to each other, so that said stopper has a generally U-shape when viewed from a side thereof; and
   when said stopper is inserted into said cord receiving hole portion, said pair of plate-like portions fixing said optical fiber cord along the axis of said optical fiber cord.

3. An optical connector according to claim 1, wherein the side edge of said positioning slit for said each of the blade portions projects a gable wedge having a cross-section corner along a thickness midline of the side edge for said each of the blade portions, the cross-section corner extending toward said positioning slit.

4. An optical connector according to claim 1, wherein the distal end edge of said plate-like portion slants from a first cross-section face of said plate-like portion to a second cross-section face of said plate-like portion.

* * * * *